Nov. 2, 1954 A. I. MIHALAKIS 2,693,131
PROJECTING INDICATING INSTRUMENT ASSEMBLY FOR VEHICLES
Filed Aug. 31, 1951 3 Sheets-Sheet 2

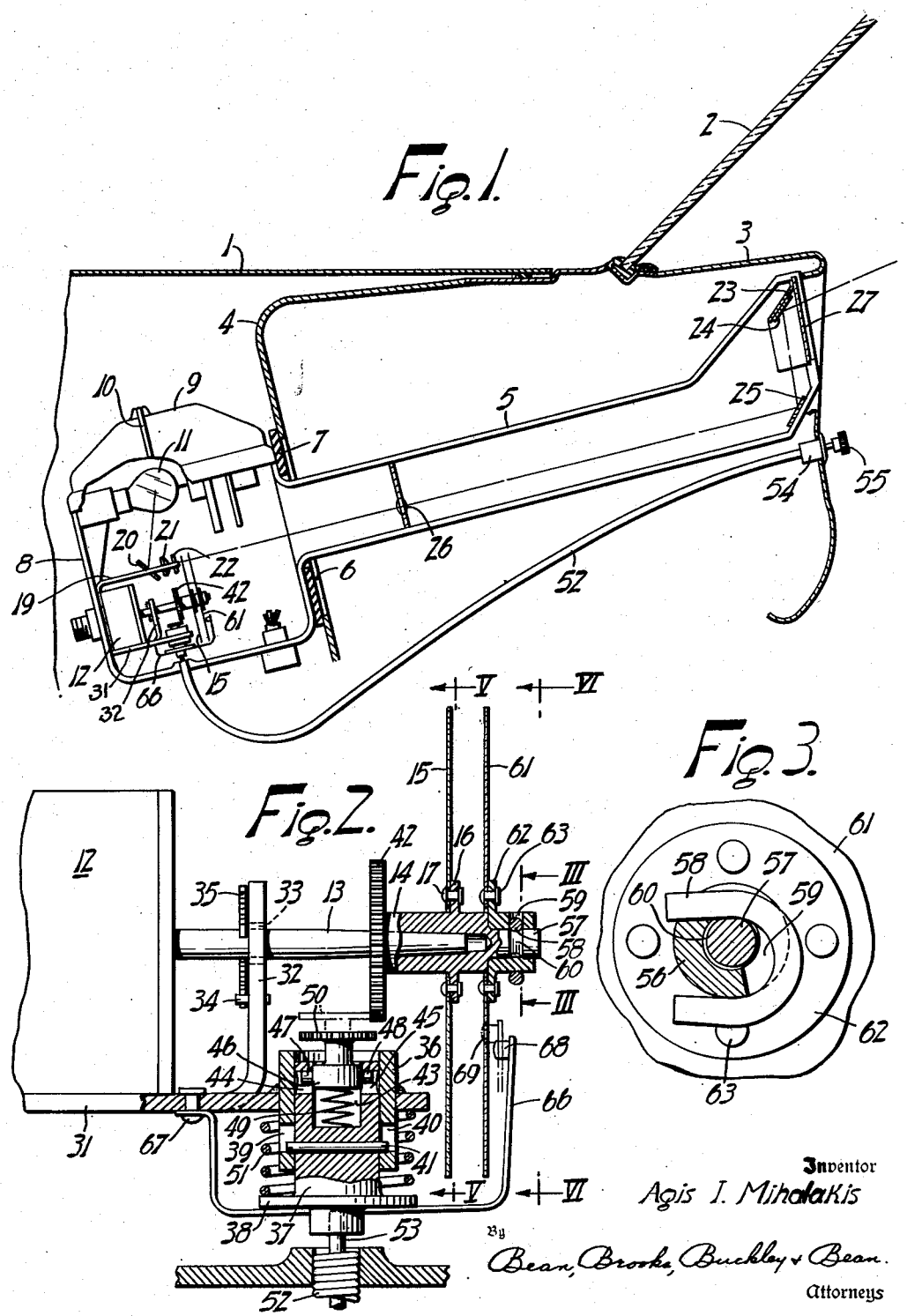

Inventor
Agis I. Mihalakis
By
Bean, Brooks, Buckley & Bean.
Attorneys

Nov. 2, 1954  A. I. MIHALAKIS  2,693,131
PROJECTING INDICATING INSTRUMENT ASSEMBLY FOR VEHICLES
Filed Aug. 31, 1951  3 Sheets-Sheet 3

Inventor
Agis I. Mihalakis

By
Bean, Brooks, Buckley & Bean.
Attorneys

United States Patent Office 2,693,131
Patented Nov. 2, 1954

2,693,131

PROJECTING INDICATING INSTRUMENT ASSEMBLY FOR VEHICLES

Agis I. Mihalakis, Buffalo, N. Y., assignor to Glowmeter Corporation, Buffalo, N. Y.

Application August 31, 1951, Serial No. 244,560

17 Claims. (Cl. 88—24)

This invention relates generally to the field of instrumentation, and more particularly to an adjustable device adapted to provide a clear and unmistakable warning whenever the reading of an associated instrument means varies from a predetermined value or range of values.

Quite often it is highly desirable, and sometimes it is absolutely necessary, that the readings of various instrument means remain at a predetermined value or within a predetermined range of values. Thus, for example, the operator of a vehicle may wish to keep his speed at exactly twenty-five or fifty miles per hour. This occasion may arise in connection with all types of vehicles, one instance when armored vehicles are maneuvering in column in which case it is necessary to maintain an exact speed in order to prevent an accordion action of the column.

Other examples include such instruments as altimeters and compasses. A pilot quite frequently must maintain an altitude intermediate a predetermined maximum and minimum in order to avoid collisions, icing conditions, and the like. So also, it is important that a pilot or navigator not vary from a predetermined course.

Another example can be found in process control installations where it is important to maintain exactly a predetermined temperature, time limitation, type and quantity of solution, and the like.

These examples could be multiplied indefinitely, but it is believed that the above are sufficient to illustrate the importance and magnitude of the problem of maintaining instrument readings at a predetermined value or within a predetermined range of values. Conventional instrument installations do not provide a solution to this problem, since they generally comprise relatively large dial faces over which a pointer or indicator moves, and an observer must continually scan the various dial faces and actually read the indications thereon to determine whether or not everything is in order. Thus, it is highly desirable that some means be provided to give an immediate and clear indication, in the nature of a warning, whenever an instrument departs from a predetermined reading.

Also, quite often the instrument reading desired to be maintained varies at different times and in different installations. Thus, it may be desired to maintain one speed at one time and another speed at another time. So also, the altitude range in which a plane must fly will vary, depending upon the flight plan, weather conditions, and the terrain over which the plane is flying. The course of a vehicle obviously will be frequently varied. Similarly, the temperature and other conditions to be maintained in a process control installation and the like will vary with different processes. Thus, it is necessary that the means for indicating a variation in an instrument reading be readily adjustable whereby to establish any predetermined value or range of values of an associated instrument as a zero or reference point.

Accordingly, it is an object of the instant invention to provide means for clearly and immediately indicating any variation in the reading of an associated instrument from a predetermined value or range of values.

Another object of the instant invention is to provide a warning device arranged to signal whenever an associated instrument varies from a predetermined indication or range of indications, together with means for adjusting said warning device to conform with any desired indication or range of indications, whereby to provide a combined warning and indicating system.

It is also an object of the instant invention to provide an improved instrument means including means arranged to give a visual warning whenever the reading of said instrument means is at variance with a predetermined value or range of values.

A further object of the instant invention is to provide an instrument mechanism including warning means for indicating whether the reading of said instrument mechanism is at or within a predetermined indication or range of indications, together with means for setting said instrument mechanism for any particular indication or range of indications.

It is another object of the instant invention to provide, in combination with a condition-responsive instrument mechanism, means utilizing a variation in color to indicate a departure of said instrument mechanism from a predetermined response.

An additional object of the instant invention is to provide, in combination with a condition-responsive instrument means having an illuminated indicia-bearing member, a warning member similarly condition-responsive and movable with said indicia-bearing member, said warning member having a portion of one color overlying the indicia corresponding to a predetermined condition and a portion of another color overlying the remainder of the indicia, whereby a variation in color is utilized to give warning of a departure from said predetermined condition, and means providing for relative movement between said members.

A further object of the instant invention is to provide a device of the aforesaid character which is relatively inexpensive to manufacture, simple and compact in construction, and entirely reliable in operation.

The foregoing and other objects will become apparent upon reading the following detailed description, taken together with the accompanying drawings wherein:

Fig. 1 is a sectional view of a vehicle instrument installation incorporating the warning device of the instant invention;

Fig. 2 is a detail view, partly in section, of the warning device of Fig. 1;

Fig. 3 is a fragmentary view taken along the line III—III of Fig. 2;

Figure 13:
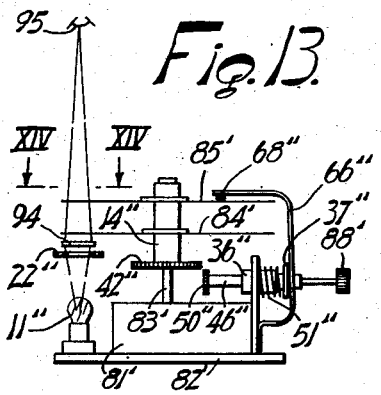
Fig. 13 is a view of another instrument installation incorporating the warning device of the instant invention.

Referring now to Figs. 1 through 8, there is shown a vehicle 1 having a windshield 2, an instrument panel structure 3, and a downwardly extending firewall 4. The instrument system and assembly of Fig. 1 is similar to that described and illustrated in applicant's copending application Serial No. 238,545, filed July 25, 1951, for an Instrument Installation, and is shown in the instant case as comprising a housing 5 extending through an aperture 6 in firewall 4, being detachably secured thereon in any appropriate manner. A gasket 7 fits between the enlarged portion 8 of housing 5 and firewall 4, and housing portion 8 is provided with a removable cover portion 9 secured thereto by a bail member 10.

Within portion 8 of housing 5 there is mounted a light source 11 and an instrument mechanism 12, the instrument mechanism in this case being a speedometer although other instrument mechanisms could be used in place thereof. Housing 5 is also adapted to contain a plurality of other instrument mechanisms, as disclosed in detail in applicant's aforesaid copending application Ser. No. 238,545. Instead of the usual indicating needle arrangement, instrument mechanism 12 is provided with a forwardly extending shaft 13 having a cap member 14 fitted over the tapered outer end thereof. A light-pervious and preferably transparent disk-like member 15 is secured to an annular flange 16 on member 14, as by means of rivets 17, and is provided with indicating indicia 18 extending substantially completely around its outer edge portion. Indicia 18 are, in the instant case, speed indicating indicia, although they would be other appropriate types of indicia when used in connection with other types of instruments. In addition, indicia 18 include scale markings, whereby an entire speed range is laid out with one mile an hour markings and with numerical indicia at 5 mile an hour intervals.

A bracket 19 is mounted within portion 8 of housing 5, and carries a light-reflecting member 20 which reflects light rays from light source 11 through a condensing lens means 21 and a masking member 22 and through a predetermined portion of indicia 18, thereby illuminating the same. At its forward end, housing 5 is provided with an inwardly extending member 23 on which there is mounted a viewing screen 24, and a light-reflecting member 25 is mounted therebeneath. Intermediate indicia-bearing member 15 and viewing screen 24 there is mounted an objective lens means 26, which lens means is focused on screen 24. Therefore, as explained in applicant's aforesaid copending application, an image of the illuminated portion of member 15 is projected onto screen 24, being intercepted and reflected thereon by member 25, and said image appears on said screen in the manner shown in Figs. 7 and 8. A transparent member 27 covers the open end of housing 5, whereby the same is rendered dust-proof and at the same time screen 24 and the image produced thereon can be viewed by the operator of the vehicle.

Screen 24 is preferably a special type of screen designed by applicant and disclosed in his copending application Ser. No. 162,851, filed May 19, 1950, and entitled "Reflecting Screen." As disclosed in said copending application, said screen comprises an opaque body having a face portion modified by a multiplicity of fine parallel grooves and ridges over which there has been applied a highly light reflective coating. The grooves and ridges on said screen are substantially vertical, and the image projected thereon is clearly visible in daylight as well as in darkness. If desired, a translucent screen may be used instead, with the screen and image projecting means being arranged to project the image through the screen.

It will be noted that masking member 22 is opaque with a light-transmitting portion 28 therein, whereby said masking member outlines a predetermined portion of the indicia 18 on member 15. Also, labeling indicia 29 and an index pointer 30, which pointer may instead be a hairline, are provided on portion 28 of masking member 22, whereby the image appearing on screen 24 is provided with a label and a pointer, as clearly shown in Figs. 7 and 8. Masking member 22 can be made in various ways, and may for example comprise a light pervious substance having appropriate blacked out portions or a member made of photographic film which has been exposed to a suitable model.

The warning means of the instant invention is constructed and arranged as follows. A bracket 31 extends outwardly from beneath instrument mechanism 12, and is provided with an upstanding flange-like member 32. Member 32 is suitably apertured, as at 33, with shaft 13 freely passing therethrough, and is provided with a projection 34 to which there is secured one end of a return clock-type spring 35 the other end of which is secured to shaft 13. A member 36 is also suitably secured to bracket 31, as by welding, and contains a slidable plunger member 37 having an enlarged head portion 38. Member 36 has opposed slots 39 and 40 slidably receiving a member 41 which extends through plunger member 37 and outwardly from opposite sides thereof, whereby the movement of plunger 37 within member 36 is limited and controlled.

A spur gear 42 is secured to the inner end of cap member 14, whereby rotation of gear 42 will cause said cap member to rotate. Plunger member 37 is provided at its upper end with a center recess 43 and side recesses 44 and 45, and a second plunger member 46 fits within recess 43 and has side projections 47 and 48 which extend into side recesses 44 and 45, respectively. A compression spring 49 extends between plunger 46 and the inner end of recess 43, and tends to bias plunger 46 outwardly of plunger 37. At its outer end, plunger 46 carries a spur gear 50 designed to engage spur gear 42, as shown by broken lines in Fig. 2. However, gear 50 is normally biased away from gear 42 by a compression spring 51 extending between bracket 31 and the enlarged head portion 38 of member 37. A Bowden wire 52 is secured to the opposite end of plunger 37 as at 53, and extends to and is secured on instrument panel 3, as at 54, being provided with a handle member 55 for manual operation by the driver of the vehicle. Thus, gears 50 and 42 will be caused to engage by pushing in on handle member 55 and overcoming the normal bias of spring 51, and gear 42 and the indicia-bearing member 15 can be rotated by pushing in on handle 55 and rotating the same.

Figure 6:
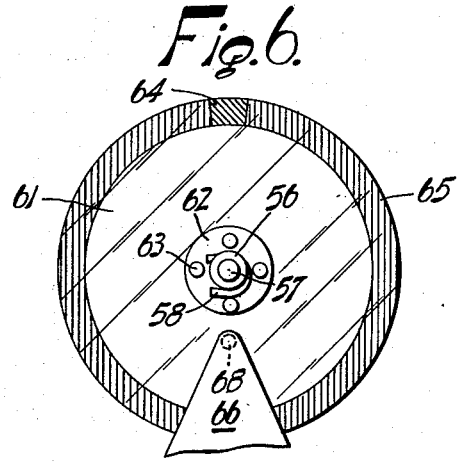
Fig. 6 is a view taken along the line VI—VI of Fig. 2.
Figure 7:
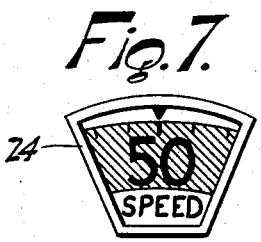
Fig. 7 shows the viewing screen of Fig. 1 with an indicating image thereon.
Figure 8:
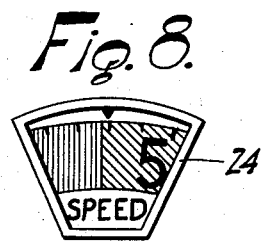
Fig. 8 shows the viewing screen of Figs. 1 and 7 with another indicating image thereon, and illustrates the operation of the warning device.
Figure 4:
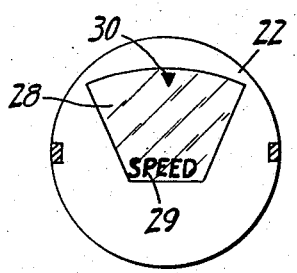
Fig. 4 is a view of the masking means utilized in the instrument installation of Fig. 1.

A hollow member 56 is fitted over a projection 57 on cap member 14, being secured thereto by means of a U-shaped retainer element 58 which extends around member 56 from the exterior thereof, through a groove 59 therein, and along a groove 60 in projection 57. Element 58 is so designed that cap member 14 and member 56 will normally rotate in unison, but can be rotated relative to each other. A light pervious disk-like member 61 is carried by a flange 62 on member 56, being secured thereto by means of rivets 63, or the like. Member 61, as shown in Fig. 6, is provided along its outer edge with a restricted portion 64 of one color, and with the remaining portion 65 being of another color. Portions 64 and 65 are alined with indicia 18, whereby the image of said indicia will be colored, and whereby the color of said indicia image will vary according to whether portion 64 or 65 is alined with the light-transmitting portion of masking member 22.

Means are provided for varying the particular indicia which are alined with portion 64 of member 61, and these means comprise the various gear mechanisms described above plus a means for holding member 61 stationary while member 15 is rotated. These latter means comprise a resilient spring member 66 which is secured at one end to bracket 31, as by means of a rivet 67, and which at its other end carries a projection 68 adapted to engage an opening 69 in member 61. Spring 66 tends to bias projection 68 into opening 69, but is normally prevented from doing so by the enlarged head portion 38 of member 37 which head portion acts as a stop member.

The operation of this invention is as follows. As previously indicated, light rays from light source 11 are reflected by member 20 through condenser lens means 21 and the light pervious portion 28 of masking member 22 to illuminate a restricted portion of the indicia 18 on member 15 as well as the labeling indicia 29 and pointer indicia 30 on member 22. An image of these illuminated indicia is projected forwardly through housing member 5, being focused on screen 24 by objective lens means 26 and being reflected thereon by member 25. This image appears on screen 24 as shown, for example, in Fig. 7. Portion 64 of member 61 is alined with the light pervious portion 28 of masking member 22, and therefore the projected image is of the same color as portion 64. While portion 64 may be of any desired color, in the instant case it is shown as being green, and therefore the projected image, which comprises a speed indication of 50 miles per hour with two one-mile-an-hour indications on either side thereof, is colored green. Since the color portion 64 is intended to indicate that the desired instrument reading is being maintained, it is assumed, in the instant case, that 50 miles an hour is the speed which it is desired to maintain.

Members 61 and 15 rotate in unison, and therefore as soon as vehicle 1 departs or varies from a speed of 50 miles per hour, both members 15 and 61 will be rotated, causing at least some of the light rays passing through masking member 22 to pass through portion 65 of member 61. Consequently, a portion at least of the projected image will be of the same color as portion 65, which is shown as red in the instant case. This is clearly illustrated in Fig. 8, wherein the projected image shows a speed of 48 miles an hour, and wherein almost half of the projected image is colored red with the remainder thereof being colored green. Similarly, if the speed of the vehicle were to increase beyond 50 miles an hour, the image would again be colored red, at least in part, starting with the right-hand portion of the image as viewed in Fig. 8.

Portion 64 is preferably made of sufficient extent to color the entire projected image when the predetermined speed is being indicated. Accordingly, as long as the desired speed of 50 miles an hour is maintained, the projected image is colored green thereby indicating that the proper speed is being held. However, upon any variation from the desired speed, including a variation as low as one mile an hour on either side of the desired speed, at least a portion of the projected image will be colored red, thereby clearly indicating that the desired speed is not being maintained. The extent to which the image is colored red depends, of course, upon the extent of variation from the desired speed, and in the instant case the image will be completely colored red upon a speed variation of approximately five miles an hour.

Thus, the warning device of the instant invention provides a clear and immediate visual warning upon any variation whatsoever from the particular speed which it is desired to maintain. This warning is accomplished by a variation in the color of the image, and consequently unfailingly attracts the attention of the vehicle operator without the necessity of his continuously scanning and studying the projected image, or a series of dial faces as in conventional instrument installations. The vehicle operator need never turn his eyes away from the road ahead, and consequently his operation of the vehicle is facilitated and rendered safer. Of course, any appropriate colors can be used in the warning device of the instant invention, and the colors red and green are illustrated solely by way of example. Also, screen 24 can be mounted on, or attached to, windshield 2, if desired.

When it is desired to maintain some speed other than 50 miles per hour, it is very easy to adjust the instrument means of the instant invention to such other speed indication. This is accomplished by pushing in handle member 55, thereby causing spur gears 50 and 42 to engage, as illustrated by broken lines in Fig. 2. At the same time, the enlarged head portion 38 of member 37 releases spring member 66, permitting the latter to bias projection 68 into opening 69, whereby member 61 is held against rotation. Handle member 55 is then rotated, causing cap member 14 and member 15 to rotate, and member 15 is thus rotated until the indicia corresponding to the speed which it is desired to maintain is alined with pointer indicia 30. This alinement can be determned by viewing the projected image. Opening 69 of member 61 is so arranged that portion 64 of member 61 is held in alinement with the light-transmitting portion 28 of masking member 22, and therefore the desired speed indication as well as two one-mile-an-hour indications on each side thereof will be alined with portion 64, and the projected image will be of the same color as portion 64. Handle member 55 is then released, and spring 51 biases gears 50 and 42 out of engagement and acts through head 38 and member 66 to remove projection 68 from opening 69. Return spring 35 then operates to cause member 15, together with member 61 which will now rotate in unison therewith, to return to a position governed by instrument mechanism 12.

The entire assembly then operates in the usual manner. As long as the new desired speed is maintained, the projected image will be colored green by portion 64. Upon any variation from the new desired speed, at least a portion of the projected image will be colored red by portion 65. Obviously, any desired speed lying within the range of indicia 18 can be associated with portion 64 of member 61. When it is desired to so adjust the instrument means, and in the event that opening 69 is not at the moment alined with projection 68, member 61 will rotate with member 15 until opening 69 is alined with projection 68, at which time said projection will snap into said opening and relative rotation between members 15 and 61 will occur. Thus, both of members 15 and 61 are movable by condition-responsive instrument mechanism 12, whereby said members are similarly condition-responsive, and means are provided for adjusting said members relative to each other.

While Figs. 1 through 8 show the warning device of the instant invention incorporated into a speed indicating instrument assembly, it obviously can be utilized with virtually any instrument mechanism. Thus, Figs. 9 through 12 illustrate the warning device of the instant invention utilized in combination with the compass and altimeter of an aircraft.

Figure 9:
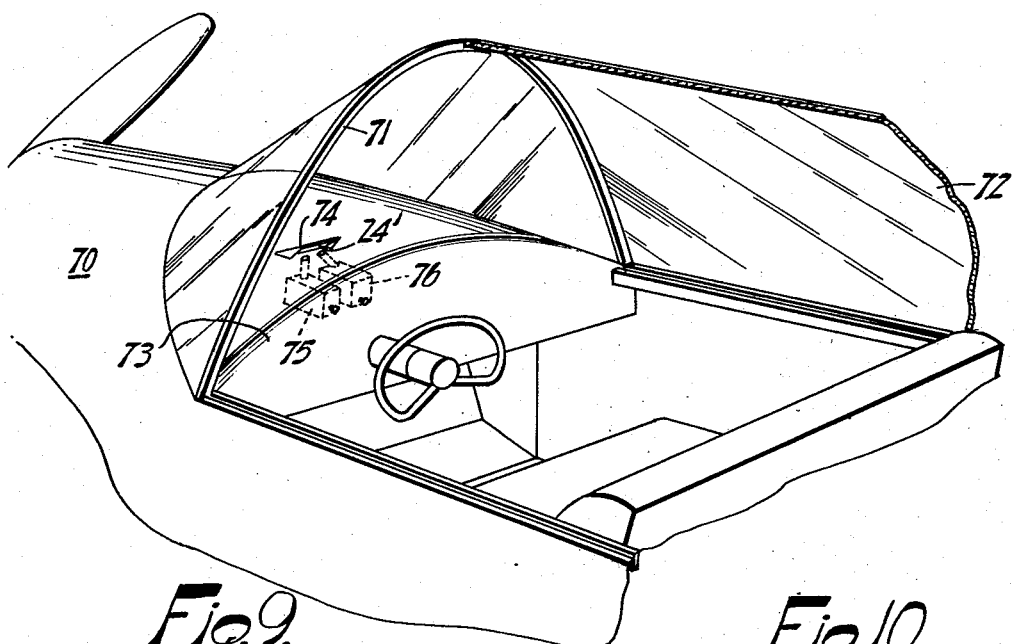
Fig. 9 is a view of a slightly different instrument installation incorporating the warning device of the instant invention and installed in place on an aircraft.

Fig. 9 shows an aircraft 70 having a windshield 71, a canopy 72, and an instrument panel 73. A viewing screen mounting member 74 is mounted on instrument panel 73, and inclined toward the pilot. Two instrument assemblies generally indicated at 75 and 76 are enclosed within instrument panel 73 and arranged to project indicating images onto screen means carried by member 74.

Figure 10:
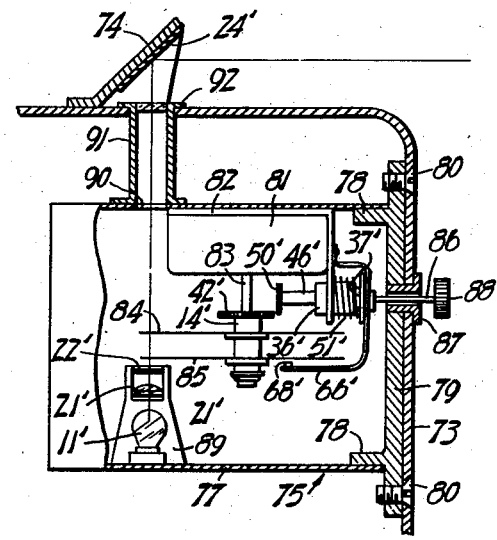
Fig. 10 is a detail view of one of the instrument assemblies and warning devices utilized in the installation of Fig. 9.

One of said instrument assemblies, such as for example 75, is shown in detail in Fig. 10, and comprises a housing 77 mounted on flanges 78 of a bracket member 79 which is secured to instrument panel 73 in any desired manner, as by bolts 80 or the like. An instrument mechanism 81 is carried by a bracket 82 within housing member 77, and has a shaft 83 projecting therefrom. Two light pervious members, comprising an indicia-bearing member 84 and a multicolored member 85, corresponding generally to members 15 and 61, respectively, are carried by shaft 83. These two members normally rotate in unison, but are adapted to be rotated relative to each other whereby to adjust the instrument means. Thus, a spur gear 42' is associated with a cap member 14' on which member 84 is mounted, and a member 36', carried by bracket 82, contains a plunger member 46' on the outer end of which there is mounted a spur gear 50'. A second plunger member 37' is carried within member 36', and is arranged to press gear 50' into engagement with gear 42'. However, a spring 51' extends between bracket 82 and member 37' to normally maintain said gears out of engagement.

Means are provided to actuate member 37', which means comprise an element 86 connected thereto and extending through a bushing 87 in bracket 79 and panel 73. At its outer end, element 86 is provided with a handle member 88. Therefore, pushing in on handle member 88 will compress spring 51' and cause gears 42' and 50' to engage. Then, rotation of handle member 88 will cause indicia-bearing member 84 to rotate. At the same time, a projection 68' carried at one end of a spring member 66' which is secured to bracket 82 is biased by said spring member into an opening in member 85 to hold the same against rotation, all in the manner previously described. Projection 68' is, of course, normally biased away from member 85 by spring 51' and member 37'. In this way, any of the indicia carried by member 84 can be alined with that colored portion of member 85 corresponding to portion 64 of member 61 and which is intended to indicate the maintaining of the desired condition.

A light source 11' is mounted beneath members 84 and 85, and is arranged to project light rays through a condensing lens means 21' and a masking member 22' carried by a bracket 89. At the top of housing member 77, and in line with the projected beam of light, there is provided an opening 90, and a tubular casing member 91 extends from said opening to the top of instrument panel 73. A light-transmitting member 92 covers the open upper end of member 91 whereby to render the same dust-proof. A viewing screen means 24', which may be similar to screen 24, is carried by member 74 to overlie casing 91. Thus, a predetermined portion of the indicia on member 84 is illuminated, and an image of this illuminated portion is projected onto screen 24', all in a manner similar to that previously described. Instrument assembly 76 is arranged in a manner identical with assembly 75, and therefore two images, one providing a compass indication and one providing an altimeter indication, are projected onto screen means 24', appearing thereon in the manner shown in Fig. 11. Also, it will be noted that said projected images include appropriate labeling and pointer indicia.

Figure 11:
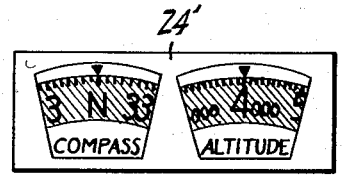
Fig. 11 shows the viewing screen of Fig. 9 with certain indicating images thereon.
Figure 12:
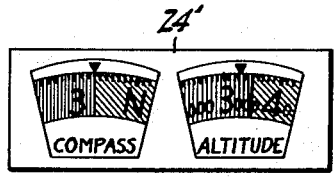
Fig. 12 shows the viewing means of Fig. 9 with slightly different indicating images thereon, and illustrates the operation of the warning device.

Member 85, like member 61 in Fig. 2, will color said projected images, and as long as the desired course and altitude is maintained, said images will be appropriately colored whereby to clearly indicate that fact. This is shown in Fig. 11 wherein both of the images are colored green. However, upon any variation whatsoever from either the desired course, north, or the desired altitude, 4,000 feet, the appropriate image will begin to change color, as shown in Fig. 12 wherein a portion of each of said images is colored red. Thus, as in the previously described installation, any variation from the condition which it is desired to maintain is clearly and immediately brought to the attention of the pilot by reason of the sudden change in the color of the images. Also, assuming that only one of said instrument assemblies departs from the desired indication, the corresponding variation in color will immediately warn the pilot, not only that there has been a departure from a desired condition, but also which of the desired conditions has been departed from.

Furthermore, it should be noted that the portion corresponding to portion 64 and intended to indicate the maintaining of a desired instrument reading, can be of any desired extent. Therefore, if it should be desired to stay within a particular range of altitude, such as from 3,000 to 5,000 feet, member 85 can be provided with an appropriately colored portion extending over that range of 2,000 feet. In addition, the same instrument installation can be easily varied to suit any conditions of operation. If it should be desired to vary the extent of the indicating range which it is desired to maintain, as from a range of 2,000 to a range of 3,000 feet, it is only necessary to interchange the colored member 85 with another suitable colored member, which interchange of parts is easily accomplished in the instant invention, as will be apparent from Fig. 2 and the means by which member 61 is secured in place. Of course, the instrument assembly of Fig. 10 can be set for virtually any desired indication, as described in connection with Fig. 2.

Figure 14:
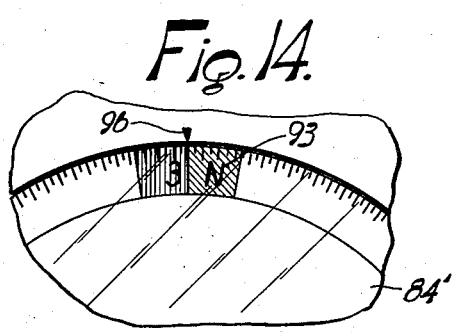
Fig. 14 is a fragmentary view of the indicating face portion of the instrument installation of Fig. 13, and showing the operation of the warning device.
Figure 5:
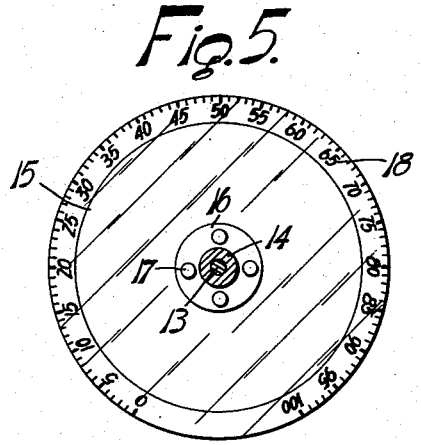
Fig. 5 is a view taken along the line V—V of Fig. 2.

Another installation incorporating the warning device of the instant invention is illustrated in Fig. 13. While shown schematically, this installation may comprise a gyrocompass or the like. As in Fig. 10, there is provided a bracket 82' carrying an instrument mechanism 81', which instrument mechanism has a shaft 83' extending outwardly therefrom. A cap member 14" fits over the outer end of said shaft and has a light-pervious indicia-bearing member 84' thereon. As shown in Fig. 14, member 84' is provided with indicia 93 around the outer edge thereof, which indicia includes appropriate markings and numerical designations representing the range of a conventional gyrocompass. Also carried by cap member 14", and in a manner so as to be rotatable relative to member 84' although normally rotating in unison therewith, is a colored disk member 85', which member 85', as in the case of member 61 shown in Fig. 6, is provided with a restricted portion of one color along its outer edge and with another color throughout the remainder of its edge portion. A light source 11" is supported by bracket 82', and is arranged so that its light rays pass through a masking member 22" and a light diffusing member 94.

This instrument is arranged so that a person wishing to observe the same looks at the face of disk 85', with his eye located as indicated at 95. By reason of masking member 22", only a restricted portion of indicia 93 and disk 85' are illuminated, and this illuminated portion includes the course being followed. As in the forms previously described and illustrated, masking member 22" is provided with a pointer indicia 96. Thus, if the desired course is being maintained, the illuminated portion of indicia 93 will be of one color. However, upon any varation in the course from the desired standard, shown in Fig. 14 as being north, at least a portion of the illuminated indicia will be of a different color by reason of the fact that members 84' and 85' normally move in unison.

When it is desired to vary the course and relocate that portion of disk 85' being used to indicate that the desired course is being maintained, disk 84' is rotated relative to disk 85' in the same manner as described in connection with the modification of Fig. 10. Thus, a member 36" is carried by an extension of bracket 82', and has contained therein a plunger member 46" provided with a spur gear 50" at the end thereof. Another spur gear 42" is carried by cap member 14". A projection 68" is carried at one end of a spring 66" tending to bias projection 68" into an opening in disk 85', whereby to hold the same stationary, said spring 66" being normally biased outwardly by reason of plunger member 37". A spring 51" extends between the extension of bracket 82" and member 37" whereby to bias the same outwardly. A handle member 88' is secured to member 37", whereby pushing in on handle member 88' will move member 37" against the action of spring 51" to cause gears 42" and 50" to engage. At the same time, spring 66" is released to cause projection 68" to engage an opening in disk 85'. Then, upon rotating handle member 88', disk 84' will be rotated relative to disk 85' whereby the mechanism can be set for any desired course. Handle 88' is then released and normal operation is resumed. Of course, if desired, members 84' and 85' can be reversed, whereby the observer will look directly at indicia-bearing member 84'.

Light diffusing member 94 is utilized to eliminate any hot spots from light source 11" which might otherwise appear in the illuminated portion of members 84' and 85'. While such a diffuser is desirable in some cases, it is not always necessary even where the illuminated dial face is viewed directly. Of course, if desired, other means can be used to diffuse the light rays. Diffusing member 94, while shown only in Fig. 13, can be used in any of the installations herein described.

Also, instead of using just two colors, one indicating that the desired condition is being maintained, and the other indicating that it is not, three different colors can be used. In the latter case, one color would indicate that the desired condition is being maintained, and the other two colors would be used to indicate a variation from the desired condition and the direction of such variation. Of course, other coloring arrangements can be used.

Therefore, it is seen that the instant invention fully accomplishes all of its intended objects, and provides a warning device wherein variations in color are utilized to give warning of a variation from a predetermined desired instrument reading. Thus, a particular color is utilized to indicate and define a predetermined instrument indication or range of indications, and so long as the desired instrument reading is maintained, the instrument reading will be of said particular color. However, upon any variation from said predetermined indication or range of indications, whichever the case may be, the instrument reading will be at least in part of a contrasting color, whereby the observer will know instantly that he is not maintaining his desired speed, altitude, course, or whatever the case may be. Also, means are provided for quickly and easily adjusting the warning device of the instant invention to any predetermined desired instrument reading.

Obviously, the instant invention is not to be limited to the particular structural details and installations herein disclosed and illustrated, and in its broader aspects the instant invention is susceptible of many modifications and of use in virtually any installation whether it be on a vehicle, in an industrial plant, or elsewhere. Accordingly, it is intended that the instant invention be limited solely by the scope of the appended claims.

Having fully disclosed the instant invention, and completely described its mode of operation, what is claimed as new is as follows:

1. In combination with a condition-responsive indicating instrument mechanism having an indicator member operable thereby, warning means operable by said mechanism to provide a signal of one color associated with a predetermined indication of said member and a signal of another color upon any variation of said member from said predetermined indication, and means for selectively adjusting said warning means relative to said member, to provide the signal of said one color at any other desired predetermined indication of said member.

2. In combination with a condition-responsive indicating instrument mechanism, a multi-colored light-transmitting member operatively connected to said mechanism for movement thereby, means including a source of illumination operatively aligned with said light-transmitting member arranged to illuminate only a restricted portion thereof, whereby the color of said illuminated portion varies to indicate the response of said instrument mechanism, and means for selectively adjusting said member relative to said instrument mechanism whereby to cause a particular color of said member to correspond to different instrument mechanism indications.

3. An indicating instrument assembly comprising an instrument mechanism, a movable indicia-bearing member operable by said mechanism, a source of illumination arranged to illuminate a restricted portion of the indicia corresponding to the actual instrument indication, means coloring the illuminated indicia with a predetermined reference color at one indication and with another color upon any departure from said one indication, and means for selectively adjusting said coloring means to provide said reference color at any predetermined indication.

4. An indicating instrument comprising a condition-responsive indicating instrument mechanism, a movable light-transmitting indicia-bearing member operatively connected to said instrument mechanism, means including a light source operatively alined with said indicia-bearing member to illuminate only a restricted area of the same, a second member normally movable with said indicia-bearing member and having light-transmitting portions of different colors therein, said light-transmitting colored portions being operatively alined with said indicia-bearing member and said light source so as to color the illuminated indicia, and means for selectively moving one of said members relative to the other to vary the color associated with a particular indicia.

5. An instrument assembly comprising an indicating instrument mechanism, an indicia-bearing member operatively connected to said instrument mechanism for movement thereby, means including a light source to illuminate a restricted area of said indicia-bearing member, a light-transmitting coloring member normally movable with said indicia-bearing member and having differently colored portions operatively aligned with said light source and said indicia-bearing member, said coloring member including one portion of a predetermined color corresponding in size to the restricted illuminated area of said indicia-bearing member, and means for selectively moving one of said members relative to the other.

6. An instrument assembly comprising a condition-responsive indicating instrument mechanism, an indicia-bearing member operatively connected to said mechanism for movement thereby, viewing screen means, objective lens means focusing said indicia on said viewing screen means, means including a source of illumination operatively aligned with said member and said objective lens means for projecting an image of said indicia on said screen means, means coloring said image with one color when said image is of predetermined indicia and with another color when said image is of other indicia, and means for selectively varying the indicia image associated with said one color.

7. An instrument assembly comprising a condition-responsive instrument mechanism having a movable light-transmitting indicia-bearing member, opaque viewing screen means, objective lens means focusing said indicia on said screen means, means including a source of illumination operatively aligned with said indicia-bearing member and said objective lens means for projecting an image of said indicia onto said viewing screen means, and coloring means comprising a member normally movable with said indicia-bearing member and having light-transmitting portions of different colors operatively alined with said indicia-bearing member and said viewing screen means for coloring said projected image with colors varying with variations in said indicia image, said coloring means being readily adjustable relative to said indicia-bearing member whereby to selectively vary the color of a particular indicia image.

8. In combination with a vehicle, an instrument assembly comprising an indicator device operatively connected to a functioning element of said vehicle, movable indicia means operatively connected to said device, viewing screen means positioned to be readily viewed by the vehicle operator, means including objective lens means interposed between said indicia means and said screen means and focusing the indicia on said screen means and a source of illumination operatively aligned with said indicia means and said objective lens means for projecting an indicia image onto said viewing screen means, coloring means normally movable with said indicia means for variably coloring said image, and means enabling selective relative movement between said indicia means and said coloring means.

9. An indicating instrument comprising a condition responsive indicating instrument mechanism, an indicia member operatively connected to said instrument mechanism for movement responsive thereto, means including a light source for illuminating a portion of said indicia member, a warning member operatively connected to said instrument mechanism for movement responsive thereto and including light-transmitting portions of different colors operatively alined with said indicia member, whereby different colors will be associated with different indicia, holding means adapted to hold one of said members against movement, said holding means being normally inoperative, drive means adapted to move the other of said members relative to said one of said members, said drive means being normally disengaged, and manually operable means for simultaneously operating said holding means and engaging said drive means whereby to selectively vary the color associated with a particular indicia.

10. A combined warning and indicating instrument comprising an indicating instrument mechanism an indicia-bearing member operatively connected thereto, said indicia-bearing member being light pervious in the region of the indicia thereon, a masking member having an aperture therein alined with the indicia on said indicia-bearing member, a light source operatively alined with the aperture in said masking member and with said indicia-bearing member whereby to illuminate a restricted portion of the indicia on the latter, a warning member movable with said indicia-bearing member and having differently colored light pervious portions alined with the light pervious portions of said indicia-bearing member, said differently colored portions including a portion of a particular color sufficient in size to cover the entire illuminated portion of said indicia-bearing member when alined with the aperture in said masking member, and means for selectively moving one of said members relative to the other to vary the indicia associated with said particular color.

11. A combined warning and indicating instrument assembly comprising an indicating instrument mechanism, a light-transmitting indicia-bearing member operatively connected to said instrument mechanism for movement thereby, means including a light source arranged to illuminate only a restricted portion of said indicia-bearing member, a warning member normally movable with said indicia-bearing member and having light-transmitting portions of different colors in operative alinement with said light source and said indicia-bearing member, means for selectively moving one of said members relative to the other to vary the indicia associated with a particular color, and light diffusing means interposed between said light source and said indicia-bearing member.

12. An indicating instrument comprising an indicating instrument mechanism having a movable indicia member, viewing screen means, objective lens means interposed between said indicia member and said screen means and focusing the indicia on said screen means, means including a source of illumination operatively aligned with said indicia member and said objective lens means for illuminating a restricted portion of said indicia member, whereby an image of the illuminated indicia is projected onto said screen means, a light-transmitting color member normally movable with said indicia member and operatively aligned therewith and with said source of illumination and said objective lens means, said color member having a portion of a predetermined color corresponding in size to said restricted illuminated portion, the remainder of said color member being of a different color, whereby one indicia image will be entirely of said predetermined color and any variation in the indicia image will be accompanied by a variation in the color thereof, and means for selectively positioning said color member relative to said indicia member.

13. An indicating instrument as set forth in claim 12, wherein said indicia member is light-transmitting.

14. An instrument assembly as set forth in claim 8, wherein said indicia means comprises a light-transmitting indicia-bearing member and said coloring means comprises a member having light-transmitting portions of different colors aligned with the indicia.

15. An instrument assembly comprising a condition-responsive indicating instrument mechanism having a movable transparent indicia-bearing member, means including a source of illumination in operative alignment with said indicia-bearing member for illuminating a restricted portion thereof, a transparent coloring member normally movable with said indicia-bearing member and having differently colored portions operatively aligned with said source of illumination and with said indicia-bearing member, one of said colored portions being of a size sufficient to completely color the restricted illuminated portion of said indicia-bearing member with a predetermined color, and means for moving one of said members relative to the other thereof whereby to selectively vary the indicia associated with said predetermined color.

16. An instrument assembly as set forth in claim 15, together with viewing screen means and objective lens means interposed between said indicia-bearing member and said viewing screen means and operatively aligned with said indicia-bearing member and with said source of illumination for focusing the indica on said viewing screen means, whereby a colored indicia image will be projected onto said viewing screen means, said viewing screen means being opaque and having a highly light-reflecting viewing surface.

17. An indicating instrument as set forth in claim 9, wherein said holding means includes a projection spring-biased for engagement in an opening in said one member, said drive means including a first gear adapted for engagement with a second gear operatively connected to said other member and means including spring means for simultaneously biasing said gears out of engagement and moving said spring-biased projection out of engagement with said opening, said manually operable means being selectively operable to simultaneously release said holding means projection for engagement in said opening and engage said gears for moving said other member relative to said one member.

References Cited in the file of this patent

UNITED STATES PATENTS

| Number | Name | Date |
|---|---|---|
| 1,144,009 | Swanson | June 22, 1915 |
| 1,629,680 | Cooke | May 24, 1927 |
| 1,757,493 | Wharam | May 6, 1930 |
| 2,165,498 | Moody | July 11, 1939 |
| 2,191,045 | Slayton | Feb. 20, 1940 |
| 2,538,218 | Treese | Jan. 16, 1951 |
| 2,579,806 | Dvorkin | Dec. 25, 1951 |
| 2,641,160 | Mihalakis | June 9, 1953 |

FOREIGN PATENTS

| Number | Country | Date |
|---|---|---|
| 436,710 | Great Britain | Oct. 16, 1935 |